May 20, 1930. E. R. ZADEMACH Re. 17,673

WASHING MACHINE

Original Filed Aug. 26, 1925 4 Sheets-Sheet 1

INVENTOR
Erich R. Zademach
BY
Robert W. Byerly
ATTORNEY

May 20, 1930. E. R. ZADEMACH Re. 17,673

WASHING MACHINE

Original Filed Aug. 26, 1925 4 Sheets-Sheet 2

INVENTOR
Erich R. Zademach
BY
Robert W. Byerly
ATTORNEY

May 20, 1930. E. R. ZADEMACH Re. 17,673

WASHING MACHINE

Original Filed Aug. 26, 1925 4 Sheets-Sheet 3

INVENTOR
Erich R. Zademach
BY Robert W. Byerly
ATTORNEY

May 20, 1930.

E. R. ZADEMACH

WASHING MACHINE

Re. 17,673

Original Filed Aug. 26, 1925

4 Sheets-Sheet 4

INVENTOR
Erich R. Zademach
BY
Robert W. Byerly
ATTORNEY

Reissued May 20, 1930 Re. 17,673

UNITED STATES PATENT OFFICE

ERICH R. ZADEMACH, OF ELIZABETH, NEW JERSEY, ASSIGNOR, BY MESNE ASSIGNMENTS, TO HOBART MANUFACTURING COMPANY, OF TROY, OHIO, A CORPORATION OF OHIO

WASHING MACHINE

Original No. 1,628,818, dated May 17, 1927, Serial No. 52,521, filed August 26, 1925. Application for reissue filed July 31, 1928. Serial No. 296,600.

This invention relates to washing machines, and aims to provide a compact machine of large capacity.

A particular object of the invention is to facilitate the insertion and removal of the articles to be washed.

The dish racks customarily used in dish washing machines are so heavy, when filled with dishes, that it is difficult to lift them vertically and they may be satisfactorily handled only by sliding them horizontally. It has, therefore, been customary to provide dish washing machines with side openings through which the racks may be slid onto a fixed support in the washing chamber. This arrangement is inconvenient, especially in small machines of moderate cost, because of the difficulty and expense of providing removable closures for the side openings of the washing chamber which will effectively prevent water from leaking out through them during the washing operation.

To avoid such leakage, washing machines of moderate size have been provided with a tank open only at the top and having a cover fitting within the top of the tank. In such machines it has been necessary to provide mechanical means for raising the dish racks to the top of the tank so that they may be handled by sliding. Furthermore, such machines have had a serious disadvantage in that when the cover is opened after rinsing the dishes in very hot water, the steam within the tank escapes suddenly and may strike and scald the attendant.

The present invention aims to do away with the disadvantages of previous machines by eliminating the danger of leakage, danger of scalding, and the necessity for mechanical means for raising dish racks, while at the same time avoiding any handling of the racks other than a simple horizontal sliding of them.

These results are attained, in accordance with the present invention, by providing an open-bottom casing to enclose a rack of dishes and form a washing chamber, and means for raising the casing to permit withdrawal of the rack in a horizontal direction. The lower edges of the casing may fit within the upper edges of an open-top tank containing washing mechanism and a support for the rack of dishes.

Other features and advantages of the invention are hereinafter described in connection with a detailed description of the machine embodying all the features of the invention which is shown in the accompanying drawings, in which Fig. 1 is a side elevation of the machine with the movable casing in raised position, showing one of the dish tables and the casing of the counterweight in section;

Fig. 6 is a fragmentary vertical section on the line 6—6 of Fig. 4 showing the controlling mechanism for a cut-off valve in the wash conduit and locking mechanism associated therewith;

Fig. 7 is an enlarged fragmentary vertical section on the line 7—7 of Figs. 1 and 4 showing the resilient bumper for arresting downward movement of the casing;

Fig. 8 is an enlarged fragmentary horizontal section on the line 8—8 of Fig. 1 showing part of the mechanism for guiding and counterbalancing the movable casing; and Fig. 9 is an enlarged fragmentary vertical section taken on line 9—9 of Fig. 4 and showing part of the mechanism for locking the control lever and the movable casing.

Figure 1:
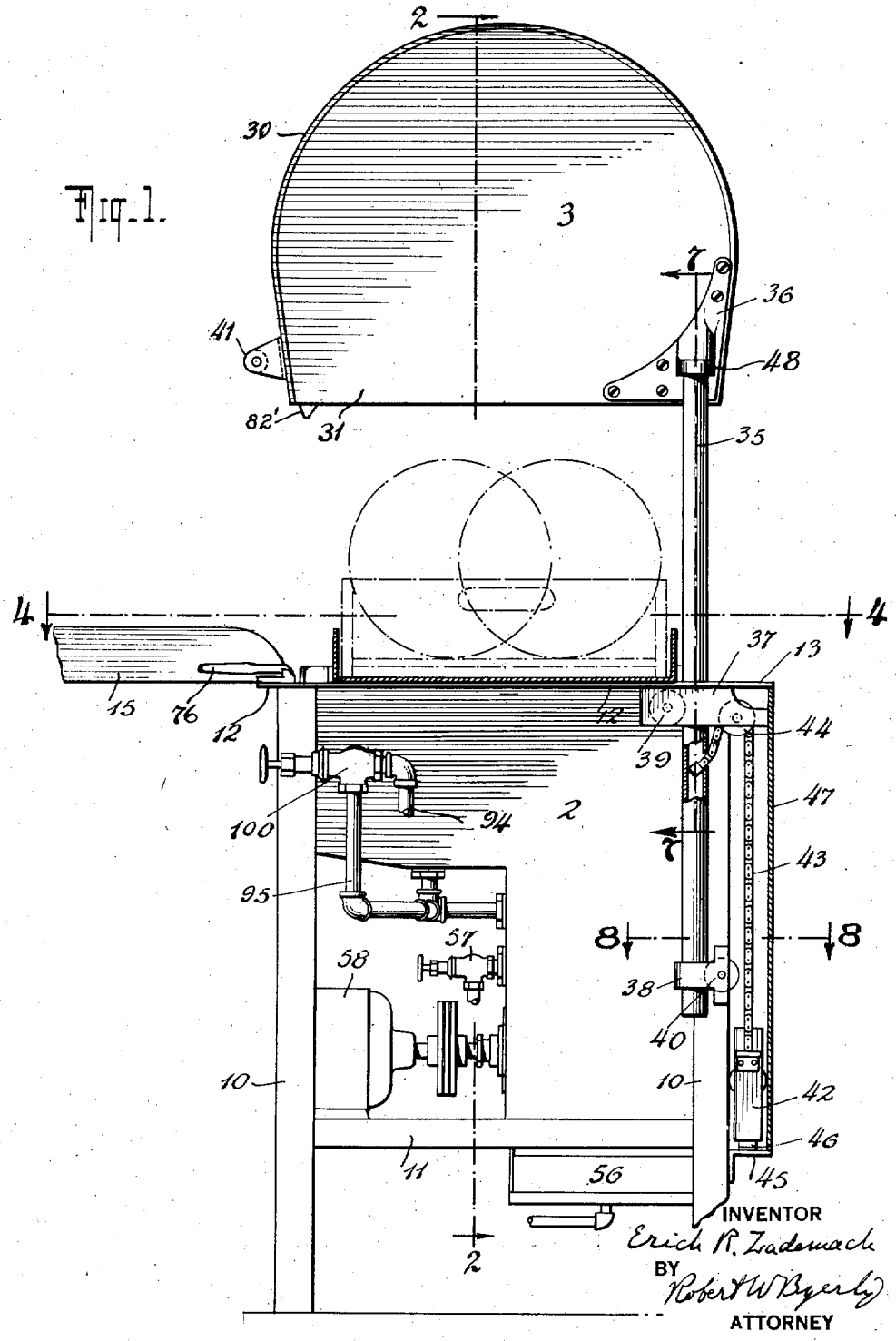
Figure 2:
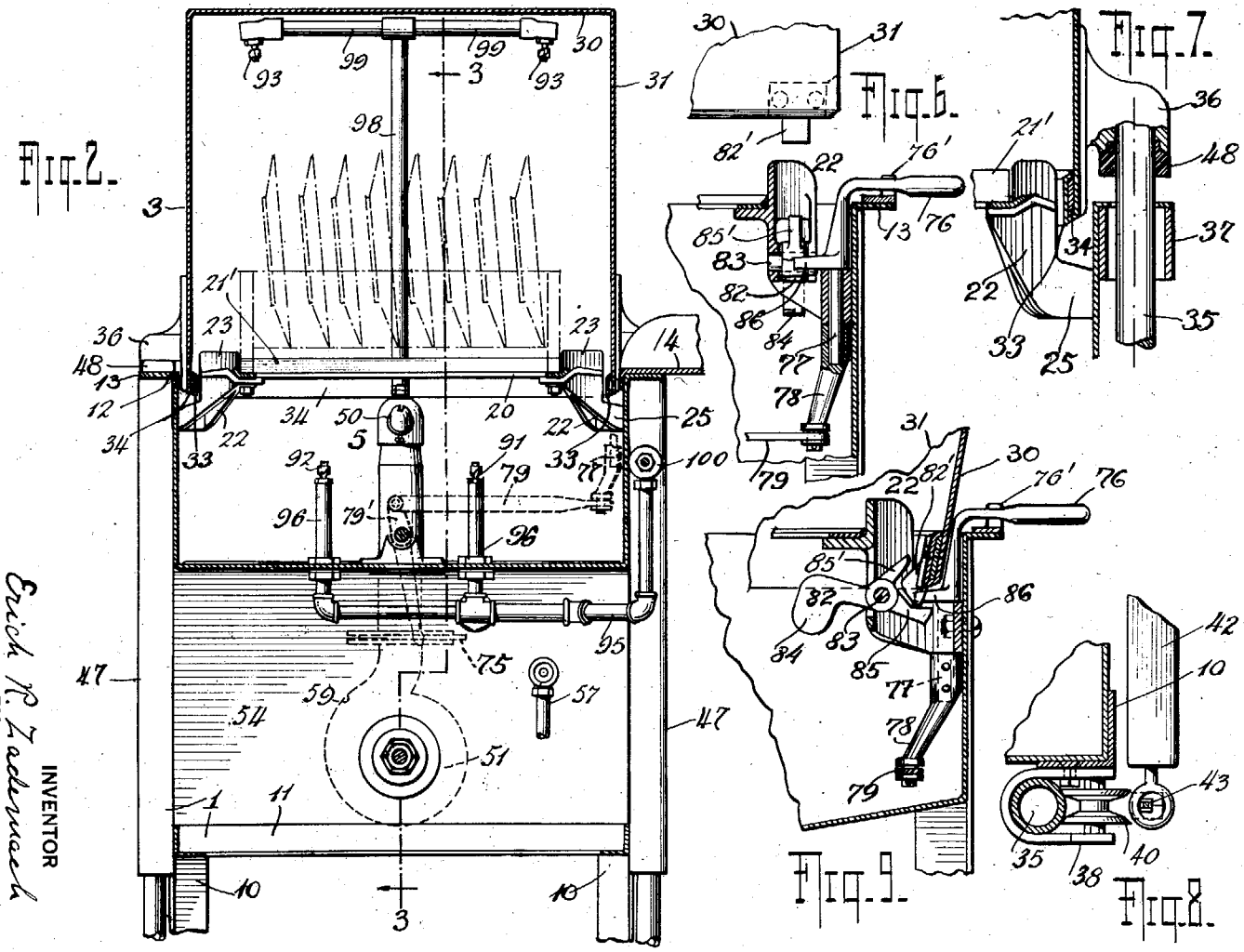
Fig. 2 is a front elevation of the machine with the movable casing in closed position, sectioned on the line 2—2 of Fig. 1.

The machine shown in the drawings has a frame 1 on which is supported an open-top tank 2 and a vertically movable open-bottom casing 3. In the upper part of the tank 2 is a support 4 for a rack of dishes. When the casing 3 is lowered, its lower edge lies inside the upper edge of the tank 2 and surrounds the outer edge of the support 4 so that the casing forms a washing chamber enclosing the support. Washing mechanism 5 and rinsing mechanism 6 are provided for washing and rinsing articles in this chamber.

The frame 1 consists of four corner posts 10, and four horizontal cross bars 11. The tank 2 is mounted within this frame with its upper edge 12 at or above the top ends of the posts 10. The tank has at its top edge 12 an external flange 13 to which the inner edges of dish tables 14 and 15 may be secured.

Figure 4:
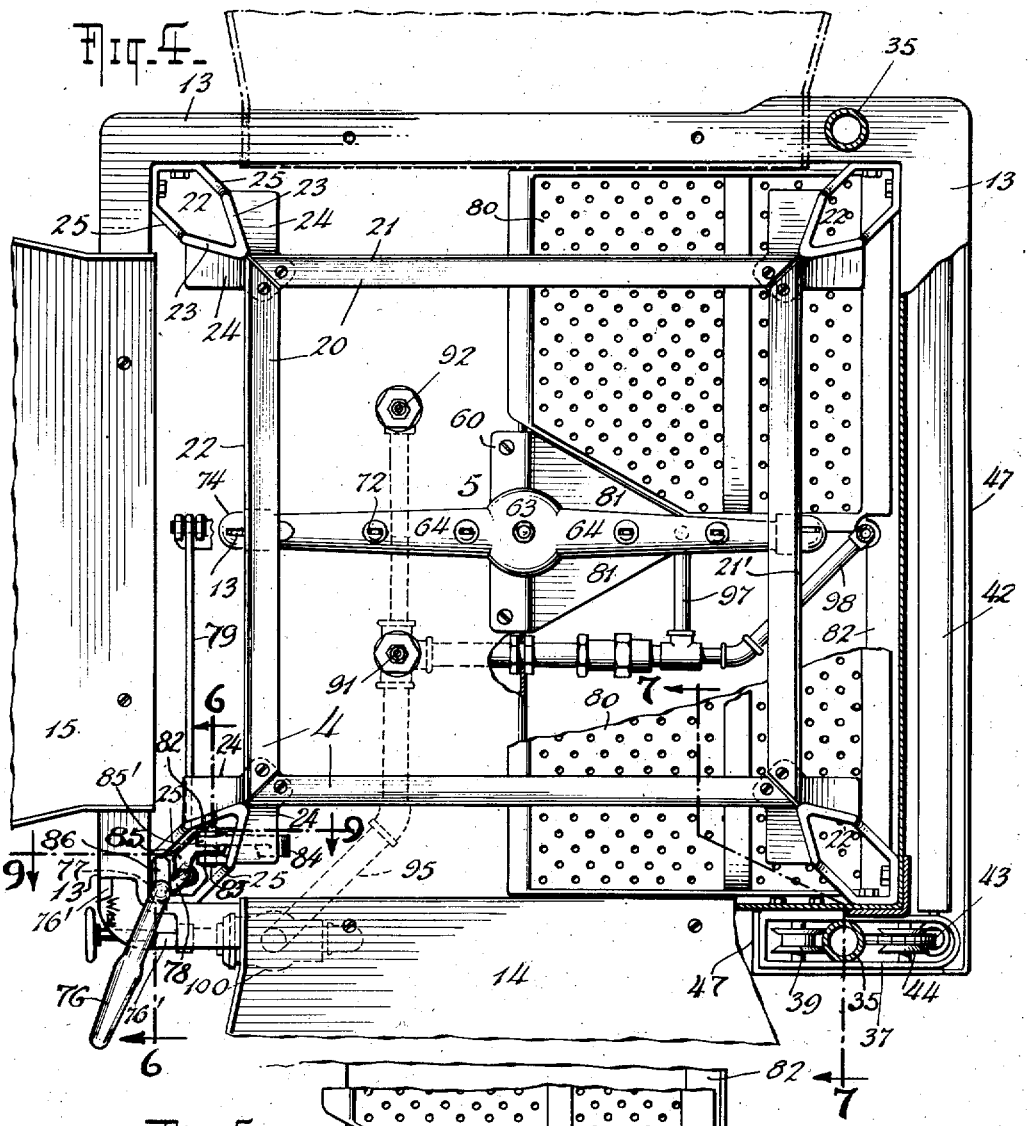
Fig. 4 is a plan view on the same scale as Fig. 3, sectioned on the line 4—4 of Fig. 1, and showing the top of the counterweight casing broken away.
Figure 5:
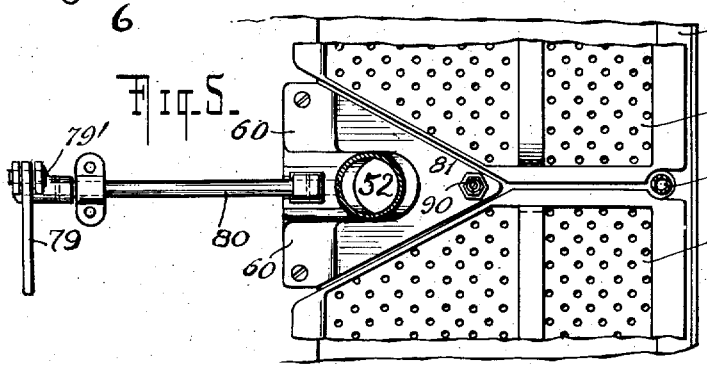
Fig. 5 is an enlarged fragmentary horizontal section on the lines 5—5 of Fig. 3, showing the wash water conduit and the parts at the inner end of the slide valve shaft.

In order that the machine may be placed in either corner of a room or against a wall, it may be desirable to place the two dish tables 14 and 15 at the front and right side of the machine, as shown in the drawings, or at the front and left side of the machine, or at the two sides of the machine. The position of a dish table at the left-hand side of the machine is indicated in dot and dash lines in Fig. 4, but it should be understood that three dish tables are not ordinarily used with the machine. As hereinafter explained the machine is arranged to permit the use of dish tables in any one or two of these three positions.

The dish rack support 4 has its upper or supporting surface 20 substantially on a level with the upper edge 12 of the tank 2 and with the inner ends of the dish tables 14 and 15. The support may be provided with a low ridge 21 about three sides of its outer edge and with a ridge 21′ of slightly greater height about its fourth side, all of which serve to position the dish racks on it. The ridge 21 is not high enough to interfere materially with sliding the racks from the support to the dish tables, but the ridge 21′ is of sufficient height to limit the rearward movement of a dish rack.

In the form shown in the drawings, the support 4 is a square open frame mounted on four brackets 22 extending inwardly from the four corners of the tank. Besides supporting the frame 4, the brackets 22 provide vertical flanges 23 which serve to guide dish racks from the dish tables to the frame 4, and horizontal flanges 24 forming a continuation of the supporting surface 20 outside the ridge 21.

The outer portions 25 of the brackets 22 are below the level of the upper edge of the tank to permit the lower edge of the movable casing 3 to enter within the upper edge 12 of the tank.

The casing 3 is mounted on the frame 1 for vertical movement between a closed position in which its lower edge lies within the upper edge of the tank and a raised position shown in Fig. 1.

The casing 3 may be made of any shape desired, although, as hereinafter explained, the most advantageous shape depends somewhat upon the type of washing mechanism used in the machine. For economy in construction, the casing 3 of the machine shown is made of three pieces of sheet metal 30, 31, of which one, 30, is curved approximately cylindrically to provide two sides and the top of the casing, while the others, 31, are flat and form the other sides of the casing. The lower edges of the three pieces are turned in about a reenforcing strip 32 which extends completely around the lower edge of the casing.

Figure 3:
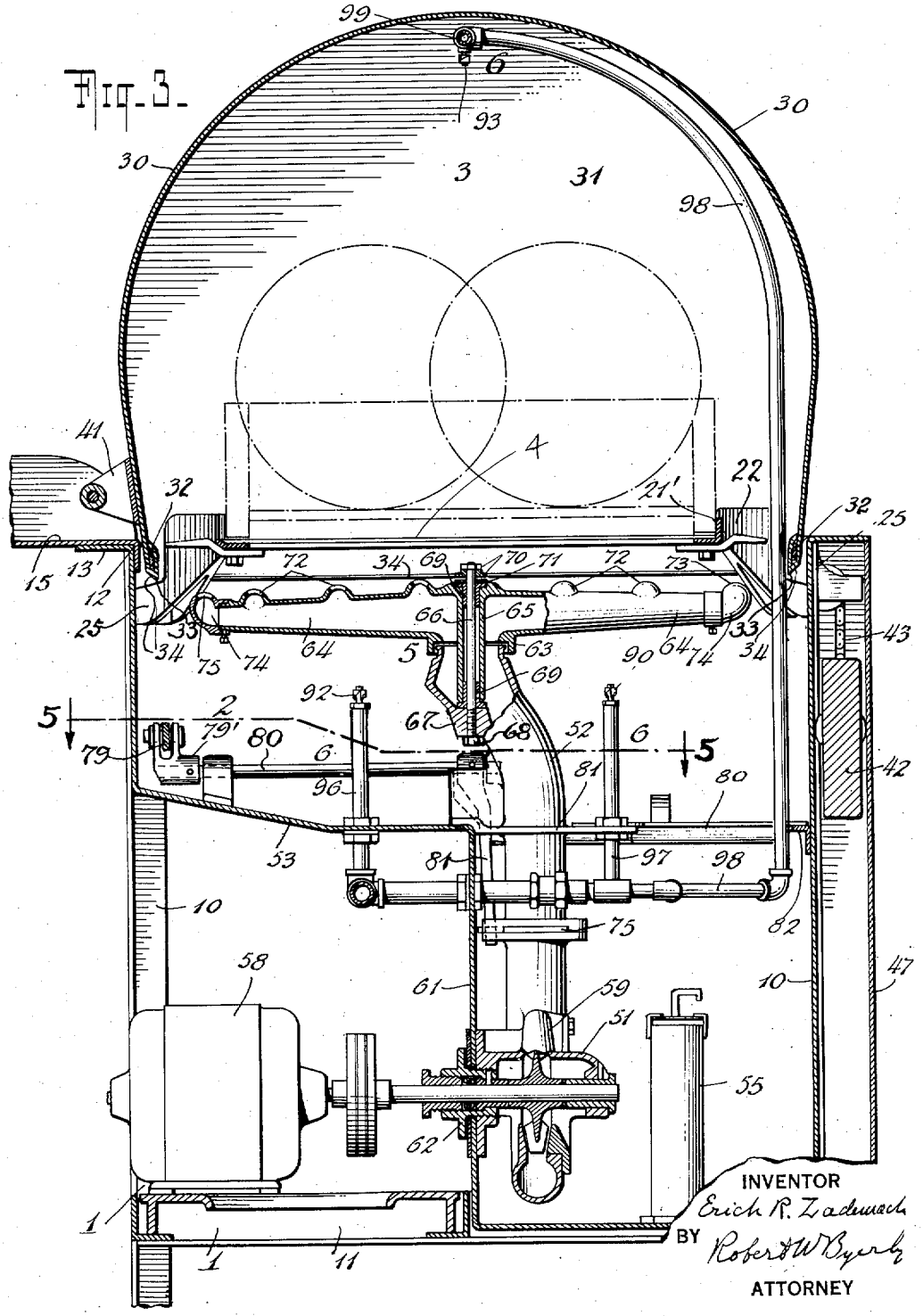
Fig. 3 is a side elevation of the machine with the movable casing in closed position, sectioned on the line 3—3 of Fig. 2, and drawn on a larger scale.

The lower edge 34 of the casing is bevelled as shown in Fig. 3 to provide a sharp inner corner 33 to direct liquid dripping from the casing into the tank 2. The casing fits loosely within the upper edge 12 of the tank 2, so as to leave a long narrow opening through which steam may escape during the washing and rinsing operations.

The mounting of the casing supports it and guides and facilitates its movement in vertical directions, and, at the same time, leaves the front and the two sides of the support 4 wholly unobstructed when the casing is raised.

The mounting includes two bars 35 secured to the casing 3 and slidably mounted on the frame 1 and means for counterbalancing the weight of the bars and casing. The upper ends of the bars 35 are fixed in brackets 36 secured to the casing at its rear corners. Each bar passes through an upper bracket 37 and a lower bracket 38 secured to one of the rear uprights 10 of the frame of the machine. In the upper brackets 37 are rollers 39 engaging the front sides of the bars and in the lower brackets 38 are rollers 40 engaging the rear sides of the bars. It is apparent that the unbalanced weight of the casing will keep the slide bars in engagement with these rollers.

The counterbalancing means, in the form shown in the drawings, include a weight 42 extending clear across the back of the frame of the machine and having a mass substantially equal to that of the casing and the slide bars combined. The weight is connected with the slide bars by means of two chains 43 which pass over the pulley wheels 44 mounted in the brackets 37 and are secured to the portions of the slide bars which lie between the rollers 39 and 40. The counterbalancing mechanism and the bracket 37, 38 are enclosed in a casing 47 whose top is formed by the rear portion of the flange 13 of the tank 2. Besides protecting the counter-weight mechanism, the casing 47 forms a dead air space which tends to prevent cooling of a liquid in the tank 2.

Resilient bumpers are provided for limiting upward and downward movements of the casing 3. Those for limiting the downward movement have the form of cushion rings 48 secured to the brackets 36 around the upper portions of the bars 35. They strike the flange 13 over the brackets 37 just after the lower edge 34 of the casing enters between the upper edge 12 of the tank and the support 4 in the space provided above the outer portions 25 of the brackets 22. A bumper 46 on a bracket 45 serves to arrest downward movement of the weight 42—and in consequence upward movement of the casing 3—when the casing reaches the position shown in Fig. 1.

Any desired form of washing mechanism may be used to project a washing medium contained in the tank 2 against articles supported in the washing chamber provided by the casing 3 when the casing is in its lowest position. This washing mechanism may, if desired, extend into the washing chamber and above the articles supported therein. It is, however, necessary that the washing mechanism be formed and positioned so as to leave at least one side of the support 4 unobstructed, and it is desirable that it should leave both sides and the front of the support unobstructed.

The washing mechanism 5 shown in the drawings is located in the tank 2 and wholly below the support 4. It includes a rotary reaction driven distributor 50, and a pump 51 and conduit 52 for forcing washing medium into this distributor.

To adapt it for use with this washing mechanism the tank 2 is given the form of an inverted L provided a raised floor 53 and a well 54. Washing liquid is maintained in the well 54 up to the top of an overflow pipe 55. The liquid in the well may be heated by means of a gas heater 56 or a steam injector 57.

The pump 51 is of the centrifugal type and is submerged in the liquid in the well 54. It is driven by an electric motor 58 located in the frame 1 in front of the well 54. The casing 59 of the pump 51 and the conduit 52 form a single rigid unit. This unit is mounted in the tank by securing a horizontal flange 60 formed on the conduit 52 to the inner edge of the floor 53 of the tank, and securing the pump casing to the front wall 61 of the well 54 by means of a stuffing box 62 surrounding the shaft of the pumps. The pumps and conduit unit may be removed from the tank by merely releasing the stuffing box and bearing 62 and by removing two screws which pass through the flange 60 into the floor 53.

The distributor 50 has a hub 63 and two arms 64 of equal length extending radially outward from the hub at diametrically opposite points. The hub 63 is closed at its top and open at its bottom. It is rotatably mounted at the upper or the discharge end of the conduit 52 by means of a sleeve 65 and a pin 66. The sleeve 65 extends downwardly from the top of the hub, out through the opening at the bottom of the hub, and into the conduit 52. It may be formed integral with the hub and arms as shown. The pin 66 is screwed into a boss 67 formed on the conduit 52 directly below the center of its discharge opening and is held therein by a lock nut 68. The pin 66 projects upwardly through the discharge opening of the conduit so that it may be extended through the sleeve 65 to project above the top of the hub as shown. Two bushings 69 are fixed in the sleeve 65 to provide a long bearing for the distributor. Downward movement of the distributor is limited by engagement of the bushing 69 with the boss 67, while upward movement of the distributor under the pressure of the liquid forced into it is limited by nuts 70 screwed on the upper end of the pin 66. When the distributor is in operation it is forced upward against the nuts 70. A bearing washer 71 is provided between the lower nut 70 and the upper end of the hub to facilitate rotation of the distributor. For the same purpose a clearance is allowed between the upper end of the conduit 52 and the lower end of the hub.

The wash arms 64 are provided with upwardly directed discharge openings 72, 73, formed to project fan-like sprays. The two ends openings 73 are inclined to the axis of the distributor to cause it to rotate by reaction. When the casing 3 is in its lowest position, all the fan-shaped sprays from the discharge openings, including those from the two end openings 73, are directed toward the inner surface of the casing 3 so that no liquid is forced out between the lower edge of the casing and the upper edge of the tank.

In order that all the articles on the frame 4 may be washed and that some liquid may strike these articles from above, each arm 64 is made longer than one-half the width of the frame 4 so that as the distributor rotates the liquid from its outer discharge openings 73 strikes the articles at the corners of the support when the arms extend diagonally of the frame, and passes up outside the frame when the arms extend across the frame, as shown in Fig. 3. In order to avoid waste and interference with the corner brackets 22, and to permit removal of the distributor for cleaning, each arm is made shorter than one-half the diagonal of the frame 4. The casing 3 provides a concave deflecting surface which causes the streams of liquid passing upwardly in front and in back of the frame 4 to meet at the top of the casing and fall downward against the articles on the frame. To accomplish this purpose, it is not essential that the casing be given the exact form shown, but is is sufficient that it have a curved top and at least two sides which merge into its top.

To avoid the necessity of stopping the pump and motor when the casing 4 is raised, a sliding cut-off valve 75 is provided in the conduit 52.

A control lever 76 having a vertical shaft extension 77 at one of the outer corners of the tank is provided for operating this valve. This lever is connected to the valve by means of an arm 78 on the shaft 77, a rod 79, a crank 79′, a shaft 80, and a rocking lever 81. Stops 76′ on the external flange 13 limit the movement of the control lever 76 in either direction.

A lock is provided for preventing movement of the control lever 76 to open the valve 75 when the casing 3 is raised, thus avoiding the danger of scalding the operator, which might occur if the washing fluid were forced into the distributor 50 when the casing was in raised position. The lock consists of a lever 82 mounted on a horizontal pivot 83 fixed in one of the brackets 22. A weight 84 from one end of this lever causes its other end 85 normally to project up into the space above the outer portion 25 of this bracket 22 and into the path of a finger 86 formed on the inner end of the control lever 76, so that when in this position it prevents movement of the control lever. When the casing 3 is moved into its closed position a catch 82′ secured to the interior of its lower edge strikes the end 85 of the lever 82 and depresses it below the finger 86 so that the control lever 76 may be moved to open the valve 75.

Means are also provided for locking the casing 3 in its closed position while the valve 75 is open, preventing the accidental movement of the casing and avoiding the consequent danger of scalding the operator. Such means consist of a finger 85′ on the lever 82, which is moved to lie above the catch 82′, when the end 85 of the lever 82 is depressed by the catch 82′ on closing the casing. When the control lever 76 is moved to open the valve 75, the finger 86 glides over the end 85, holding it in its down position and consequently locking the lever 82 and the casing against upward movement.

Rinsing apparatus 6 is provided for rinsing articles on the support 4 after they have been washed. The rinsing apparatus shown in the drawings includes three upwardly directed distributors 90, 91, 92, below the support 4 and two downwardly directed distributors 93 above the support 4. Rinsing fluid from a supply pipe 94 is led to the rinse distributors by a conduit 95 which has branches 96, 97 extending to the distributors 90, 91, 92, and a branch 98 extending up between the back wall of the tank and the support 4 to a point directly above the middle of the support 4, where it carries a horizontal pipe 99 on the ends of which the distributors 93 are supported. The branch pipe 98 is curved, as shown, so that it and the horizontal pipe 99 lie close to the inner surface of the casing 3 when the casing is in closed position. The pipes 98 and 99, therefore, in no way obstruct the front or either side of the frame 4. The flow of the rinsing fluid through the conduit 95 and its branches is controlled by a valve 100 located in a convenient position directly below the lever 76 which controls the slide valve 75.

The rinse distributors are adapted to project conical sprays, and may consist of nozzles of the form shown and claimed in Merseles U. S. Patent No. 1,481,327, issued January 22, 1924. The conical sprays projected from the lower nozzles 90, 91, 92 are all directed toward the inner surface of the casing 3 when the casing is closed so that they cause no leakage around the lower edge of the casing.

In the use of the machine, the motor 58 and the pump 59 are operated continuously, while the washing mechanism is controlled by the lever 76 and the rinsing sprays are controlled by the valve 100. After the articles in a dish rack have been washed and rinsed and the valves 75 and 100 have been closed, the casing 3 is raised by means of a handle 41 to the position shown in Fig. 1, and the dish rack on the frame 4 is slid onto one of the dish tables 14, 15. A rack of soiled dishes from the other table is then slid onto the frame 4. The casing 3 is then moved down by the handle 41 until its lower edge strikes the brackets 22, and the dishes in the next rack are then washed and rinsed.

Comparatively little physical effort is required to use the machine, since all motion of the dish racks is horizontal, and the rollers 39 and 40 and the counterweight 42 make it easy to raise and lower the casing 3.

No leakage occurs, since all of the liquid projected from the wash and rinse distributors 50, 90, 91, 92, 93, which does not fall directly into the tank, strikes the inner surface of the casing 3 and drains back into the tank from the bevelled lower edge of the casing. This is also true of such liquid as condenses in the casing after the casing has been raised.

All danger of scalding the operator is avoided, since the greater part of the steam contained in the washing chamber remains in the casing 3 when it is raised, and rapidly condenses. A little steam may escape just as the lower edge of the casing 3 passes the upper edge of the tank 2, but owing to the fact that the opening between these edges extends all the way around the tank, this steam does not come out with sufficient force to cause any injury.

Certain features of the washing mechanism which have been described form the subject matter of claims in the co-pending application of Herbert E. Merseles and Frank W. Bemm filed October 9, 1919, Serial No. 329,533, now Patent No. 1,559,727, granted Nov. 3, 1925, and of claims of the co-pending application of Henry R. Merseles, filed May 20, 1924, Serial No. 714,568, now Patent No. 1,737,257, granted Nov. 26, 1929, and are in consequence not claimed herein.

What is claimed is:

1. In a washing machine, the combination of a distributor for directing a liquid upwardly and outwardly, a valve controlling the supply of liquid to the distributor, a vertically movable casing open at its bottom, a normally locked control lever for said valve, and means for automatically unlocking said control lever when the casing is moved downwardly to a position in which its inner surface will intercept the liquid projected from the distributor.

2. In a washing machine, the combination of a distributor for directing a liquid upwardly and outwardly, a valve controlling the supply of liquid to the distributor, a vertically movable casing open at its bottom, a normally locked control lever for said valve, means for automatically unlocking said control lever when the casing is moved downwardly to a position in which the inner surface will intercept the liquid projected from the distributor, and means actuated by moving the control lever to open the valve to lock the casing is its closed position.

3. In a washing machine, the combination of a tank having a movable cover, a liquid distributor, a valve controlling the supply of liquid thereto, a control lever for said valve, movable in a direction transverse to that in which the cover moves, a movable member, movable in the direction in which the cover moves, and yieldable means for normally positioning said member in the path of the control lever and in the path of the closing movement of the cover.

4. In a washing machine, the combination of a tank having a movable cover, a catch on said cover, a liquid distributor, a valve controlling the supply of liquid thereto, a control lever for said valve movable in a direction transverse to that in which the cover moves, a locking member movable in the direction in which the cover moves and having a part normally lying in the path of the cover, and a part adapted to lie above the catch on the cover when the first part is depressed by the cover, and a projection on the control lever positioned to strike the first part of the locking member when the locking member is in its normal position, and to move between the two parts of the locking member when the locking member is depressed.

5. In a washing machine, the combination of a support for the articles to be washed, a downwardly directed distributor above said support, a cashing open at its bottom and adapted to enclose articles on said support and said distributor, and a conduit leading from below the support to the distributor and a mounting for the casing permitting vertical movement thereof, both located so as to leave the front and sides of the support unobstructed.

6. In a washing machine, a tank open at its top, a closure for said tank, and a mounting for said closure permitting vertical movement thereof, preventing movement thereof in all other directions, and comprising vertical members located substantially at the rear edge of the tank so as to leave the front and sides of the tank unobstructed.

7. In a washing machine, a rectangular support for the articles to be washed, a casing open at its bottom and adapted to enclose articles on said support, and a mounting for said casing permitting vertical movement thereof and comprising a plurality of vertical rods all located outside the corners of said support so as to leave all sides thereof unobstructed when the casing is raised.

8. In a washing machine, a support for the articles to be washed, a casing open at its bottom and adapted to enclose articles on said support, and a mounting for said casing permitting vertical movement thereof and comprising vertical members located wholly behind the rear edge of said support so as to leave the sides and front of the support unobstructed when the casing is raised.

9. In a washing machine, a tank open at its top, a support in said tank with its supporting surface on a level with the upper edge of the tank, brackets secured to the inner wall of the tank and to said support and having their outer portions below the level of the upper edge of the tank, a vertically movable casing open at its bottom, and resilient means for arresting downward movement of the casing when its lower edge enters between the support and the upper edge of the tank.

10. In a washing machine, a support for the articles to be washed, a distributor located below said support and having discharge openings positioned to direct a liquid upwardly against articles on the support and discharge openings positioned to direct liquid upwardly outside two opposite edges of the support at the same time, and a casing above said support having a curved top and two opposite sides merging into said top to form a concave deflector.

11. In a washing machine, a rectangular support for the articles to be washed, a rotary distributor below said support having radial arms provided with upwardly directed discharge openings at their ends, the length of each of said arms being greater than one-half the width of the support, and a casing above the support having a curved top and two sides merging into its top to form a concave deflector.

12. In a washing machine, a fixed open square support for the articles to be washed, a removable distributor below said support having radial arms provided with upwardly directed discharge openings at their ends, the length of each of said arms being greater than one-half the width of the support and less than one-half the diagonal of the support.

13. In a washing machine, the combination of a tank having the form of an inverted L and providing a raised floor and a well, a rigid unit including a pump casing in said well and a conduit extending upward from the pump casing and above said floor, and a horizontal flange on said conduit resting on the floor.

14. In a washing machine, the combination of a tank having the form of an inverted L and providing a raised floor and a well, and a rigid unit including a pump casing and a conduit having an external horizontal flange and secured in said tank by attaching said pump casing to one side of said well and said flange to the inner edge of said floor.

15. In a washing machine, the combination of a tank open at its top, a support for the articles to be washed at the top of the tank, a distributor directed towards articles on the support, a valve controlling the supply of fluid to said distributor, an open bottom casing vertically movable between a lower position in which it encloses articles on said support and an upper position in which it permits removal of said articles, and means for preventing the opening of said valve when the casing is in its upper position.

16. In a washing machine, the combination of a liquid distributor, a valve controlling the supply of liquid to the distributor, a manually movable casing open at its bottom, a mounting for guiding said casing vertically between a lower position in which it intercepts liquid from said distributor and a raised position, and means operative on the opening of the valve to prevent upward movement of the casing from its lower position while the valve is open.

17. In a washing machine, the combination of a liquid distributor, a valve controlling the supply of liquid to said distributor, an operating lever for said valve, a manually movable casing open at its bottom, a mounting for guiding said casing vertically between a lower position in which it intercepts liquid from said distributor and a raised position, a member connected to said casing, and means actuated by moving the control lever in opening the valve when the casing is in its lower position to prevent movement of said member while the valve is open.

18. In a washing machine, a distributor, a tank and cover for confining liquid distributed therefrom, a valve controlling the supply of liquid to the distributor, and means locking the cover shut except when the valve is completely closed and locking the valve closed except when the cover is completely shut.

19. In a washing machine, a distributor, a tank and cover for confining liquid distributed therefrom, a control handle means actuated by manual movement of said handle to control the supply of liquid to the distributor, and means locking the cover shut except when said control handle is positioned to prevent the supply of liquid to the distributor and locking said control handle in position to prevent the supply of liquid to the distributor except when the cover is completely shut.

In testimony whereof I have hereunto set my hand.

ERICH R. ZADEMACH.